US009345093B2

(12) United States Patent
Zudrell-Koch (10) Patent No.: US 9,345,093 B2
(45) Date of Patent: May 17, 2016

(54) LINE VOLTAGE SWITCH EVENT DETECTION FOR LED ASSEMBLIES

(71) Applicant: Dialog Semiconductor GmbH, Kirchheim/Teck-Nabern (DE)

(72) Inventor: Stefan Zudrell-Koch, Hohenems (AT)

(73) Assignee: Dialog Semiconductor GmbH, Kirchheim/Teck-Nabern (DE)

( * ) Notice: Subject to any disclaimer, the term of this patent is extended or adjusted under 35 U.S.C. 154(b) by 16 days.

(21) Appl. No.: 14/339,504

(22) Filed: Jul. 24, 2014

(65) Prior Publication Data

US 2015/0028775 A1    Jan. 29, 2015

(30) Foreign Application Priority Data

Jul. 24, 2013  (EP) ..................................... 13177908

(51) Int. Cl.
| | | |
|---|---|---|
| G05F 1/00 | (2006.01) | |
| H05B 37/02 | (2006.01) | |
| H05B 39/04 | (2006.01) | |
| H05B 41/36 | (2006.01) | |
| H05B 33/08 | (2006.01) | |
| H05B 41/392 | (2006.01) | |

(52) U.S. Cl.
CPC ........ *H05B 33/0851* (2013.01); *H05B 33/0815* (2013.01); *H05B 33/0818* (2013.01); *H05B 33/0845* (2013.01); *H05B 33/0896* (2013.01); *H05B 37/0209* (2013.01); *H05B 37/0281* (2013.01); *H05B 37/02* (2013.01); *H05B 41/3927* (2013.01)

(58) Field of Classification Search
CPC ........... H05B 33/0815; H05B 33/0818; H05B 33/0845; H05B 37/02; H05B 41/3927; Y10S 315/07; Y10S 315/04; Y02B 20/346; Y02B 20/42; H02M 3/156

USPC ............. 315/209 R, 219, 223, 247, 276, 291, 315/307, 308, 360
See application file for complete search history.

(56) References Cited

U.S. PATENT DOCUMENTS

2010/0156467 A1\* 6/2010 Sun et al. ......................... 326/96
2010/0253244 A1\* 10/2010 Snook et al. ................... 315/307

(Continued)

FOREIGN PATENT DOCUMENTS

EP          2521423        11/2012

OTHER PUBLICATIONS

European Search Report 13177908.4-1802 Mailed: Feb. 20, 2014, Dialog Semiconductor GmbH.

*Primary Examiner* — Alexander H Taningco
*Assistant Examiner* — Christian L Garcia
(74) *Attorney, Agent, or Firm* — Saile Ackerman LLC; Stephen B. Ackerman (57) ABSTRACT

A controller for controlling the illumination state of a light source of solid state lighting devices such as LED or OLED assemblies, is presented. The controller controls the light source according to a plurality of illumination states subject to determine an event of a plurality of events. The controller controls a power converter that converts power derived from an input voltage waveform of line voltage power supply into a drive signal for the light source. The controller determines an event of a plurality of events encoded within the input voltage waveform of the line voltage power supply. A first state processor determines a next illumination state of the plurality of illumination states, based on the determined event and based on the current illumination state. Line voltage Switch event detection is performed while no power is available at the line voltage terminals.

29 Claims, 5 Drawing Sheets

(56) References Cited

U.S. PATENT DOCUMENTS

| | | |
|---|---|---|
| 2011/0109249 A1 | 5/2011 | Liu et al. |
| 2011/0227496 A1* | 9/2011 | Lin et al. .................. 315/209 R |
| 2012/0268027 A1* | 10/2012 | Shin .............................. 315/224 |
| 2013/0334980 A1* | 12/2013 | Zhou et al. .................... 315/250 |

* cited by examiner

LINE VOLTAGE SWITCH EVENT DETECTION FOR LED ASSEMBLIES

TECHNICAL FIELD

The present document relates to illumination systems. In particular, the present document relates to a controller for controlling the illumination state of solid state lighting devices such as LED or OLED assemblies.

BACKGROUND

The illumination level of LED or OLED assemblies, e.g. lamps, may be controlled using standard line voltage on/off switches, e.g. by a user switching the line voltage switch on and off according to a given on/off pattern, thereby signaling dimming information to a lamp assembly. The control of the light emission level in the lamp assembly can be done in different ways applying stepwise or continuous dimming to the light source in response to turning the line voltage switch off and on again in a rapid way.

A challenge in implementing a line voltage switch event detection in the lamp assembly is that the function must be performed at a controller of the lamp assembly while no power is available at the line voltage terminals because the line voltage switch is temporarily (e.g. for up to a second) in its off position. An energy storage element may be used to keep a control element of the lamp assembly, i.e. the controller, in operation during this phase. An electrolytic capacitor may be used, which stores sufficient energy to drive the circuits during the time periods where no line voltage power is available.

The use of electrolyte based capacitors, which act as temporary power source for the controller, introduces disadvantages for the LED assembly design, such as long startup times (large capacitance), additional cost (electrolyte based capacitors are expensive to manufacture), additional component size (electrolytic capacitors have a large form factor), and limited lifetime especially at elevated temperatures (electrolytic capacitors dry out).

SUMMARY

The present document is directed at overcoming the above indicated limitations related to line voltage switch event detection while allowing a flexible configuration of on/off switching and at fully exploiting the excellent dimmability and controllability of LED or OLED based lamp assemblies. The controller described in the present document enables line voltage event detection for controlling the illumination states of light sources in all kinds of applications. It is an aim of the proposed solution to overcome the above indicated disadvantages caused by using electrolyte based capacitors with a new way of detecting line voltage switch events facilitating the use of smaller energy storage elements, namely capacitors that can be of a ceramic type, which are available at low cost and have a larger lifetime. A controller configured to control the illumination states of a light source is described. In particular, the controller is configured to provide low power counting and monitoring functions in order to facilitate the control of illumination states of the light source even at times when no power is available at the line voltage terminals because the line voltage switch is temporally off. In other words, the controller is implemented to provide a standby mode (called power-off mode), in which counting and monitoring functions can be executed efficiently. The controller thus allows the power consumption of the system for controlling the illumination states of the light source to be minimized.

Typical examples for light sources that can be controlled by the proposed controller are solid state lighting (SSL) devices such as an array of one or more light emitting diodes (LEDs) or of one or more organic LEDs (OLEDs).

An illumination state of the light source may describe the behavior of the light source (e.g. the intensity level of the light source as a function of time). Examples for illumination states are a DIM state, e.g. a DIM-UP state or a DIM-DOWN state, during which an intensity level of the light source increases or decreases at a pre-determined dim rate; an ON state during which the intensity level of the light source is substantially constant e.g. at a pre-determined maximum intensity level; an OFF state during which the intensity level of the light source is substantially zero; and one or more HOLD states, during which the intensity level of the light source is maintained substantially constant at the intensity level of the light source at the time of entering the corresponding HOLD state. Alternatively or in addition, one or more FIXED states may be defined. A FIXED state may be defined as a state during which the intensity level of the light source is maintained substantially constant at a respective predetermined intensity level.

The controller may be configured to control a light source according to a plurality of illumination states subject to determine an event of a plurality of events. For this purpose, the controller may be configured to control a power converter that converts power derived from an input voltage waveform of a line voltage power supply of the lamp assembly into a drive signal for the light source. The controller may be further configured to operate at least in a power-on mode and in a power-off mode. The controller may comprise an event detection unit configured to determine an event of the plurality of events encoded within the input voltage waveform of the line voltage power supply. The event detection unit may be configured to operate in the power-on mode. A first clock circuit may be configured to generate a first clock signal. The first clock circuit may be enabled to operate in the power-on mode and disabled in the power-off mode. A first state processor may be configured to determine a next illumination state of the plurality of illumination states, based on an event determined by the event detection unit and on a current illumination state. The determining of the next state may be in accordance to a predetermined state machine which encodes a plurality of states, conditions for state transitions and parameters for operating the power converter in a respective state. The first state processor may be configured to operate in the power-on mode and in accordance to the first clock signal. The first state processor may be disabled in the power-off mode. A second clock circuit may be configured to generate a second clock signal. The second clock circuit may be enabled to operate at least in the power-off mode. A control circuit may be configured to operate in the power-off mode and in accordance to the second clock signal. The control circuit may comprise a timing circuit for determining a power-off time value that indicates the time since the power-off mode has been entered. In response to determination of a line voltage power-off event by the event detection unit, the controller may change the operation mode from the power-on mode to the power-off mode, and the timing circuit may be enabled to start counting. In response to determination of a line voltage power-on event, the controller may change the operation mode from the power-off mode to the power-on mode where the next illumination state may be determined by the first state processor.

In other words, the controller may operate in two power modes, namely a power-on mode and a power-off mode. The illumination states of the light source may be determined by the first state processor of the controller when the controller operates in the power-on mode. Elements of the controller which are configured to operate in the power-on mode may be disabled when the controller operates in the power-off mode, thereby substantially reducing the power consumption during line voltage power-off times. In addition, elements of the controller which are configured to operate in the power-off mode may be disabled when the controller operates in the power-on mode, thereby substantially reducing the power consumption. Alternatively, the elements of the controller which are configured to operate in the power-off mode may remain enabled when the controller operates in the power-on mode. For example, the second clock circuit may operate in both modes and providing a master clock signal that is used by the first clock circuit to generate a faster first clock signal during power-on mode.

The provision of a dedicated low power logic (i.e. the control circuit of the controller operating in the power-off mode in order to execute counting and monitoring functions by means of, at least, the embedded timing circuit) resolves the conflict that energy storage elements, e.g. capacitors which act as temporary power source for the controller, shall be large for bridging the line voltage power-off times up to e.g. a second of time and small at the same time due to cost and startup time.

The above indicated predetermined state machine may be encoded into the first state processor of the controller (e.g. as software, firmware or hardware). Typically, the state machine defines a plurality of illumination states, as well as events which trigger transitions between the illumination states. The controller may be configured to set or adjust the plurality of illumination states, the plurality of events and/or the above indicated predetermined state machine, thereby defining the transitions between the pluralities of illumination states.

More specifically, the controller may be configured to set or adjust one or more parameters of the plurality of events, e.g. the physical conditions which need to be met for determining an event. As indicated above, an event is encoded within the input voltage waveform. The parameters, which define the conditions (e.g. a root mean square voltage value of the input voltage waveform) which define an event, may be adjustable. In a similar manner, the controller may be configured to set or adjust one or more parameters of the plurality of illumination states (e.g. the behavior of the light source within each of the plurality of illumination states). In particular, the controller may be configured to define and adjust settings of the illumination system (e.g. the duty cycle of a power switch), which control the respective behavior of the light source for the corresponding illumination states. The settings of the controller (e.g. the length of the duty cycle of a power switch) may be stored in a state register. In addition, the controller may be configured to adjust the logic comprised within the first state processor, wherein the logic defines how the next illumination state is determined based on a determined event by the event detection unit and based on the current illumination state. In other words, the controller may be configured to adjust the logic of the predetermined state machine.

The plurality of events that control the illumination states may comprise a predetermined modulation of the input voltage waveform. In other words, the plurality of events may be defined via a respective predetermined modulation of the input voltage waveform. Examples for such a predetermined modulation may be switching the line voltage off, a modulation of a phase section of the input voltage waveform and/or a modulation of the amplitude of the input voltage waveform or the frequency. For example, a power-on event may be provided that indicates that the line voltage power supply is active and provides an input power voltage to the controller. A power-off event may indicate that the line voltage power supply is switched off and no input power voltage is applied to the controller.

Moreover, the plurality of events may comprise one or more sequential events. A sequential event may comprise a sequence of instant events in a pre-determined chronology like an OFF/ON event where the input voltage is switched off for a short period of time (e.g. less than 1 sec) and subsequently switched on again. Further events will be explained below.

The event detection unit is thus configured to continuously observe the input line voltage in order to determine possible events defined by predetermined modulation of the input voltage waveform in the power-on mode. Alternatively or in addition, the event detection unit may be further configured to determine the above indicated events in the power-off mode.

The controller may be implemented using a digital programmable control integrated circuit. Thus, the configuration of events can be done by means of an on-chip OTP (one-time programmable) memory. In particular, the controller may be implemented using a chip solution without the use of a microcontroller. As such, the controller for the power converter and the intelligence for determining line voltage switch events may be implemented on a single chip. In particular, the logic for line voltage switch events detection and/or for the control of the power converter may be implemented as hardware (and not software), thereby reducing the required resources, memory and the required clock frequency. In other words, the controller may be implemented as an integrated circuit using wired logic.

The controller may be implemented to further comprise a memory unit. Upon determination of a line voltage power-on event, the control circuit may be configured to store the current power-off time value, measured by the timing circuit, in the memory unit. The first state processor may be configured to determine the next illumination state based on the current illumination state and the power-off time value stored in the memory by the control circuit and read by the first state processor. Further parameters and event data may be stored in the memory unit and read, e.g. by the first state processor.

The storage of the current power-off time value upon determination of a subsequent line voltage power-on event facilitates distinguishing line voltage switch events, i.e. on/off switching, for controlling a light source from glitches, i.e. from sudden instances of malfunctioning or irregularities. In addition, events such as an event "ON" (an event that can be used to change the illumination state of the light source to the ON state) or an event "OFF" (an event that can be used to change the illumination state of the light source to the OFF state) can also be determined/distinguished from line voltage switch events, i.e. on/off switching, by using the stored current power-off time value. It should be noted that other events could be defined by comparing the counter values of the timing circuit of the controller with different reference values in order to enable the determination of such events.

For instance, the controller may be further implemented such that, if the measured power-off time value is smaller than a minimum power-off time value, the next illumination state is the same as the current illumination state. Therefore, by means of comparing the power-off time value to a minimum power-off time value, a glitch in the line voltage is easily determined and compensated.

The controller may be further implemented such that, if the next illumination state is a DIM state, the controller may control the power converter such that a drive signal for the light source is generated that varies over time, in order to effect an increasing or decreasing light emission from the light source. In the same manner, the controller may control the power converter such that a drive signal for the light source is generated, in order 1) to effect an increase of the intensity level of the light source up to a pre-determined maximum intensity level and to maintain the intensity level of the light source substantially constant at the pre-determined maximum intensity level, if the next illumination state is an ON state; 2) to effect a decrease of the intensity level of the light source to substantially zero and to maintain the intensity level of the light source substantially constant at substantially zero, if the next illumination state is a OFF state; and 3) to maintain substantially constant the intensity level of the light source at the intensity level of the light source at the time of entering a HOLD state (e.g. a HOLD1 state or a HOLD2 state) if the next illumination state is one of the possible HOLD states. Accordingly, the controller may further control the power converter such that a drive signal for the light source, e.g. a variable or a continuous drive signal, is generated in order to control the intensity level of the light source for any of the defined illumination states of the light source.

Upon determination of a line voltage power-off event, the controller may disable the first state processor, the first clock circuit and the event detection unit. Disabling elements of the controller which are not required upon determination of a line voltage power-off event substantially reduces the power consumption of the controller during the line voltage power-off times, i.e. when the controller operates in the power-off mode.

Upon determination of a line voltage power-off event, the controller may further control the power converter to switch off the drive signal for the light source. Thus, upon determination of a power-off event, the power consumption of the illumination system for controlling the illumination states of the light source is minimized.

The controller may be implemented to further comprise a state register configured to store an indication of the current illumination state of the plurality of illumination states, e.g. a state index. In addition, as indicated above, the state register may store further settings of the controller (e.g. the length of the duty cycle of a power switch) corresponding to a state.

The controller and possibly the entire lighting device may be stopped by the control circuit when the measured power-off time value exceeds a maximum wait time before a consecutive line voltage power-on event is determined. Therefore, by means of comparing the power-off time value (e.g. by comparing the counter of the timing circuit) to a maximum wait time, a normal off, namely an event "OFF", can easily be determined and the controller stopped. Alternatively, if the power-off time value exceeds a maximum wait time before a consecutive line voltage power-on event is determined, the controller may be set to an additional state (e.g. by setting an OFF flag in the memory unit) which would facilitate the startup of the controller upon determining a subsequent line voltage power-on event (occurring after the maximum wait time has lapsed). Moreover, a reset of the controller may optionally be performed when the power-off time value exceeds the maximum wait time before a subsequent line voltage power-on event is determined.

The controller may be further implemented such that the control circuit comprises a second separate state processor for tracking events relating to power supply on/off during power-off mode, e.g. line voltage power on/off events and/or power supply-low/high events. Upon detection of a line voltage power-off event, the second state processor may enter a power-down state where the timing circuit is enabled. A line voltage power-on event may be determined in the power-down state when a power supply-high event is determined before a power supply-low event is determined.

Therefore, the second state processor, which may operate only in the power-off mode, would be able to track, inter alia, a power supply-high event and may provide the determination of a line voltage power-on event when the controller is in the power-off mode, thereby preventing the need for enabling the elements of the controller which operate in the power-on mode, resulting in reduction of power consumption.

It should be noted that the above mentioned second state processor may adopt some or all of the functions of the first state processor, in accordance to the operation mode of the controller. In this case, the second state processor may be configured to determine the next illumination state in accordance to the above indicated predetermined state machine. The second state processor may include a predetermined second state machine which may be encoded into the second state processor (e.g. as software, firmware or hardware). The first and second state processor may communicate via the memory unit, e.g. to exchange information for synchronizing both state processors.

The controller may be further implemented to be connected to an energy storage element to power the controller during power-off times when no power is supplied by the line voltage power supply. The energy storage element is preferably a small ceramic capacitor.

The controller may be further configured to determine a power supply-low event if a voltage supplied by the energy storage element during a power-off time drops below a first voltage threshold.

The controller may be further configured to determine a power supply-low event if the power-off time value exceeds a minimum counter value before a line voltage power-on event is determined. The determination of a power supply-low event by means of comparing the power-off time value, i.e. the counting value of the timing circuit, to a minimum counter value provides a simplified approach for determining a power supply-low event, wherein no further detection means, e.g. voltage detection means or current detection means, are necessary.

The controller may be further configured to determine a power supply-high event if a voltage supplied by the energy storage element to the controller exceeds a second voltage threshold. This is when the line voltage power supply is switched on and provides power to the energy storage element which in response recharges until it reaches the second voltage threshold. The second voltage threshold may be different to the first voltage threshold, or it may be the same.

The determination of power supply events, e.g. power supply-low event or power supply-high event, may be performed in conjunction with or in addition to a voltage detection means or a current detection means. This provides additional control means.

The controller may be further configured to control the power converter in accordance with the current illumination state by providing one or more control signals for one or more switching elements of the power converter. For instance, the controller may control the power converter using e.g. a pulse width modulated (PWM) signal to control the duration of the on- and off-states of a power switch (e.g. a MOSFET) of the power converter. The power converter may thus be configured to receive AC power from a rectifier in combination with EMI (electromagnetic interference) filter components and may operate to output a controlled drive signal to the light source according to the control signals of the controller. It should be noted that the controller may comprise switch element(s) itself to control the power converter. The power converter can be provided by any suitable circuit topology, e.g. a buck converter circuit, a boost converter circuit, a buck/boost converter circuit, a SEPIC (single-ended primary-inductor converter) circuit, or a flyback converter circuit.

The controller may be further implemented such that the second clock circuit is the master clock and may be configured to operate in the power-on mode and in the power-off mode. The first clock circuit may generate the first clock signal in the power-on mode based upon the second clock signal. The clock frequency of the first clock may be higher than the frequency of the second clock in order to clock the first state processor and the power converter which operate on a higher clock cycle than the control circuit.

In particular, the controller may comprise a timebase unit, e.g. an oscillator, configured to generate one or more clock signals in synchronization with a cycle of the line voltage power supply. In other words, the timebase unit, e.g. an oscillator, may analyze the input voltage waveform (or a signal derived from the input voltage waveform) to determine one or more clock signals. The one or more clock signals may be used for event detection or to control operation of the controller, e.g. to be in synch with the line voltage power supply. As such, the event detection unit may be configured to determine an event under consideration of the one or more clock signals (e.g. in case of a sequential event). Furthermore, one or more of the plurality of illumination states may take into account the one or more clock signals (e.g. the DIM state in order to define the dim rate). In addition, the one or more clock signals may be taken into account to manage the transition from the current illumination state to the next illumination state in order to implement a smooth transition between the current illumination state and the next illumination state.

A method for controlling a light source according to a plurality of illumination states subject to determine an event of a plurality of events is described. The method may operate in a power-on mode and a power-off mode, In the power-on mode, the method may comprise operating a first clock circuit to generate a first clock signal. Further, the method may further comprise controlling a power converter that converts power derived from an input voltage waveform of a line voltage power supply into a drive signal for the light source, according to the current illumination state and the first clock signal. Moreover, the method may further comprise detecting an event of the plurality of events encoded within the input voltage waveform of the line voltage power supply. In addition, the method may further comprise operating a first state processor to determine a next illumination state of the plurality of illumination states, based on a detected event and on a current illumination state and in accordance to the first clock signal. The method may further comprise, in response to determining of a line voltage power-off event, changing the operation mode from the power-on mode to the power-off mode.

In the power-off mode, the method may comprise disabling the power converter, the first clock circuit and the first state processor. Further, the method may comprise enabling a timing circuit to start counting based on a second clock signal. Moreover, the method may further comprise determining a supply voltage, e.g. provided by a capacitor, and comparing the supply voltage to a first voltage threshold. If the comparing step determines that the supply voltage is below the first voltage threshold, it may be determined that the light source is supposed to be switched off. The method may then further comprise disabling the timer circuit and setting a flag to indicate that the light source is switched off. In addition, the method may further comprise, in response to determining a line voltage power-on event, determining a power-off time value based on the counter of the timing circuit and changing the operation mode from the power-off mode to the power-on mode. In this manner, the first state processor may determine the next illumination state based upon the determined power-off time value. If the power-off time value is smaller than a minimum power-off time value (i.e. the drop of the line voltage power supply voltage is too short), a power glitch is assumed and the current illumination state is maintained. Otherwise, the next illumination state may be determined according to a state machine implemented in the first state processor.

It should be noted that the light source may comprise a plurality of sub light sources (e.g. LED units). The controller may be configured to control the plurality of sub light sources using a respective plurality of drive signals. The controller may be configured to control the power converter (or a respective plurality of power converters) to provide a corresponding plurality of drive signals for the plurality of sub light sources.

In general, SSL light source devices can be dimmed in different ways. Common techniques are changing the level of the DC current supplied to the device or changing the average current using PWM (pulse width modulation) control. Any combination of both techniques is also possible. This document refers to all different dimming techniques.

It should be noted that the aspects as outlined in the present document may be used stand-alone or in combination. Furthermore, all aspects outlined in the present document may be arbitrarily combined. In particular, the features of the claims may be combined with one another in an arbitrary manner.

BRIEF DESCRIPTION OF THE DRAWINGS

The invention is explained below in an exemplary manner with reference to the accompanying drawings, wherein.

DESCRIPTION

In the present document a light bulb "assembly", e.g. LED Lamp assembly, includes all of the components required to replace a traditional incandescent filament-based light bulb, notably light bulbs for connection to the standard electricity supply. In British English, this electricity supply is referred to as "mains" electricity, while in US English, this supply is typically referred to as "line voltage". Other terms include AC power, line power, domestic power and grid power. It is to be understood that these terms are readily interchangeable, and carry the same meaning. Moreover, the particular configuration of the radiated light at a given point in time of the light source is referred to as the illumination state.

Typically, in Europe electricity is supplied at 230-240 VAC, at 50 Hz and in North America at 110-120 VAC at 60

Hz. The principles set out in the present document apply to any suitable electricity supply, including the European and North American line voltages mentioned, and a DC power supply, and a rectified AC power supply.

Figure 1:
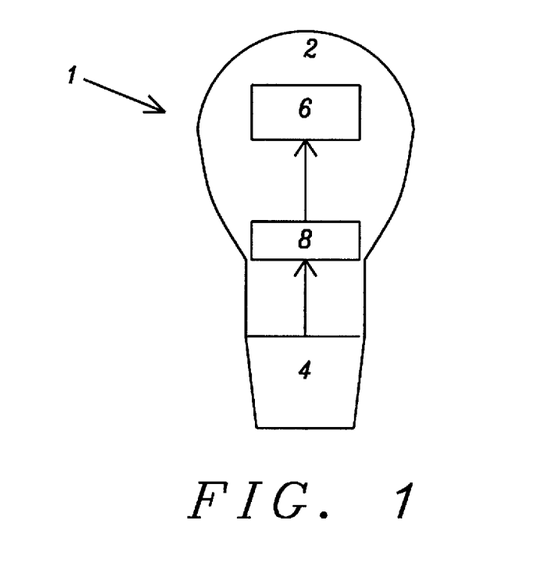
FIG. 1 illustrates a block diagram of an example light bulb.

FIG. 1 is a schematic view of a light bulb assembly. The assembly 1 comprises a bulb housing 2 and a base including an electrical connection module 4. The base can be of a screw type or of a bayonet type, or of any other suitable connection to a light bulb socket. Typical examples for standardized bases are the E11, E14 and E27 screw types of Europe and the E12, E17 and E26 screw types of North America. Furthermore, a light source 6 (also referred to as an illuminant) is provided within the housing 2. Examples for such light sources 6 are a CFL tube or a solid state light source 6, such as a light emitting diode (LED) or an organic light emitting diode (OLED) (the latter technology is referred to as solid state lighting, SSL). The light source 6 may be provided by a single light emitting device, or by a plurality of LEDs.

Driver circuit 8 is located within the bulb housing 2, and serves to convert supply electricity received through the electrical connection module 4 into a controlled drive current for the light source 6. In the case of a solid state light source 6, the driver circuit 8 is configured to provide a controlled direct drive current to the light source 6.

The housing 2 provides a suitably robust enclosure for the light source and drive components, and includes optical elements that may be required for providing the desired output light from the assembly. The housing 2 may also provide a heat-sink capability, since management of the temperature of the light source may be important in maximising light output and light source life. Accordingly, the housing is typically designed to enable heat generated by the light source to be conducted away from the light source, and out of the assembly as a whole.

In the following, methods and systems will be described in the context of LED lamps. It should be noted, however, that the methods and systems described herein are equally applicable to controlling the power provided to other types of illumination technologies such as other types of SSL based lamps (e.g. OLEDs).

Figure 2:
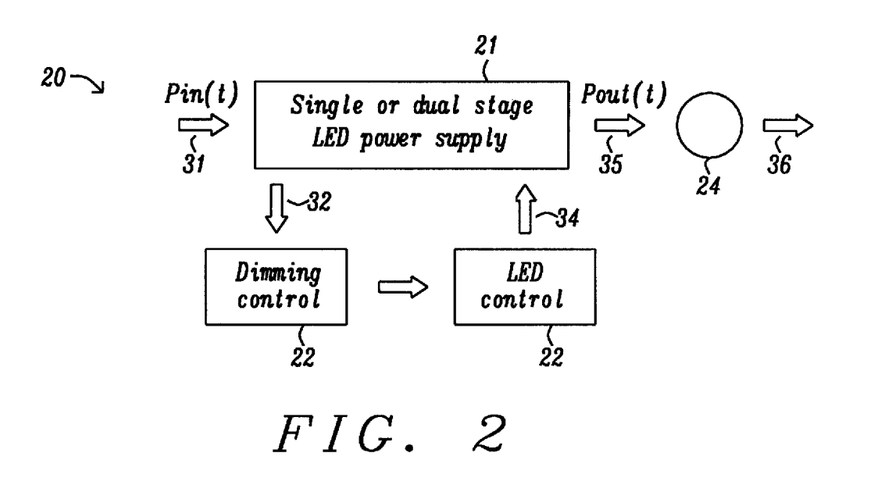
FIG. 2 illustrates an example driver circuit for a LED lamp.

FIG. 2 illustrates a block diagram of a driver circuit 20 (that is similar or equivalent to the driver circuit 8 of FIG. 1) which may be used to control the power for illuminating LED 24 based on power provided by the line voltage power supply. The driver circuit 20 receives an input power 31 from the line voltage supply. The input power 31 may have been modulated using a line voltage switch (on/off).

The example driver circuit 20 of FIG. 2 comprises a dimming control unit 22 which senses the input voltage 32 and determines switch events. Based on the detected switch events and in accordance to a pre-defined state machine, a desired dim level is determined and is passed to a LED control unit 23 which controls the single or dual stage LED power supply 21 via a control signal 34 to provide an output power 35 to the LED 24 (referred to as light source 6 in FIG. 1) which drives the LED 24 to provide light 36 at the desired dim level.

Figure 3:
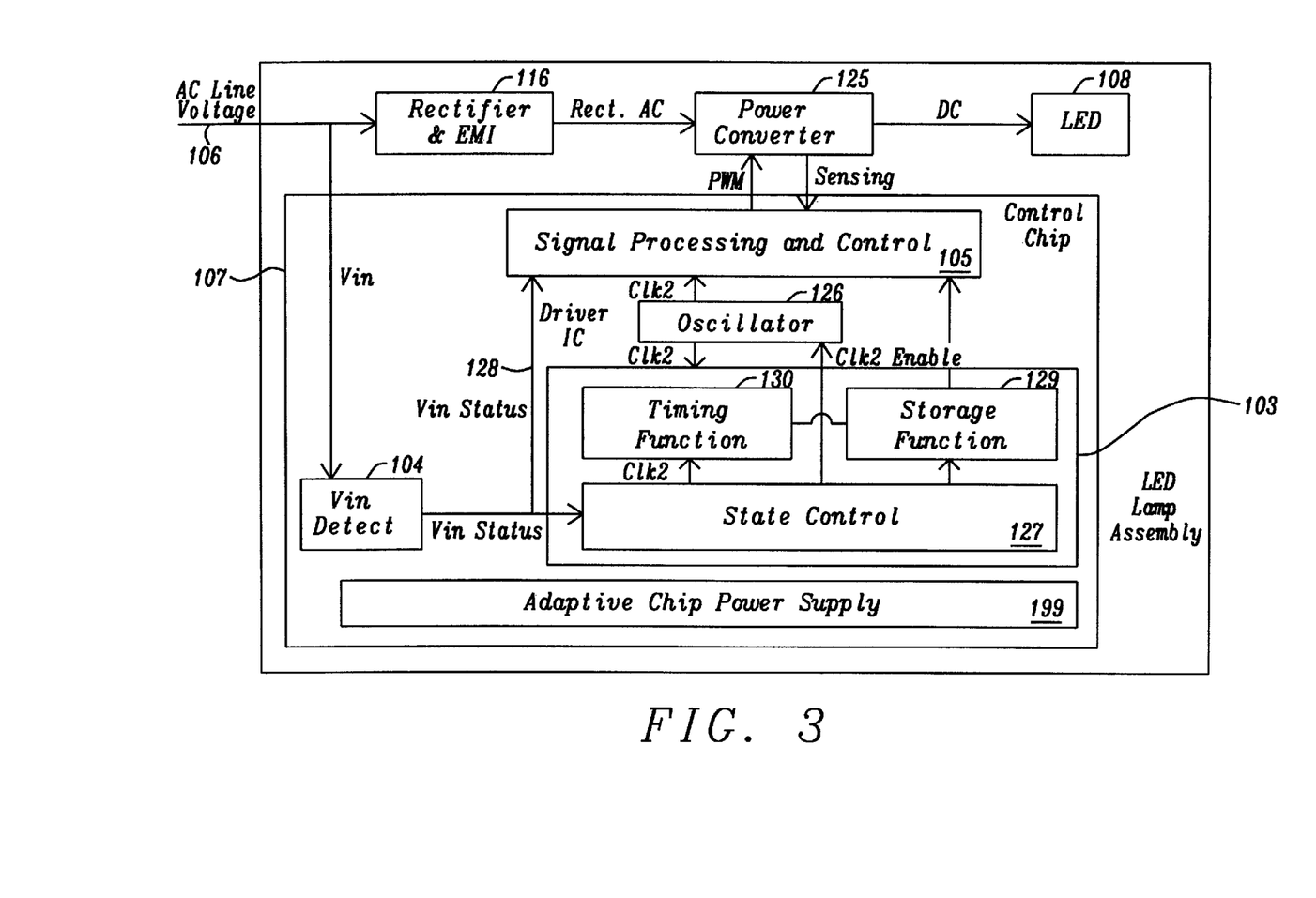
FIG. 3 illustrates a general view of an illumination system, e.g. a LED lamp assembly.
Figure 4:
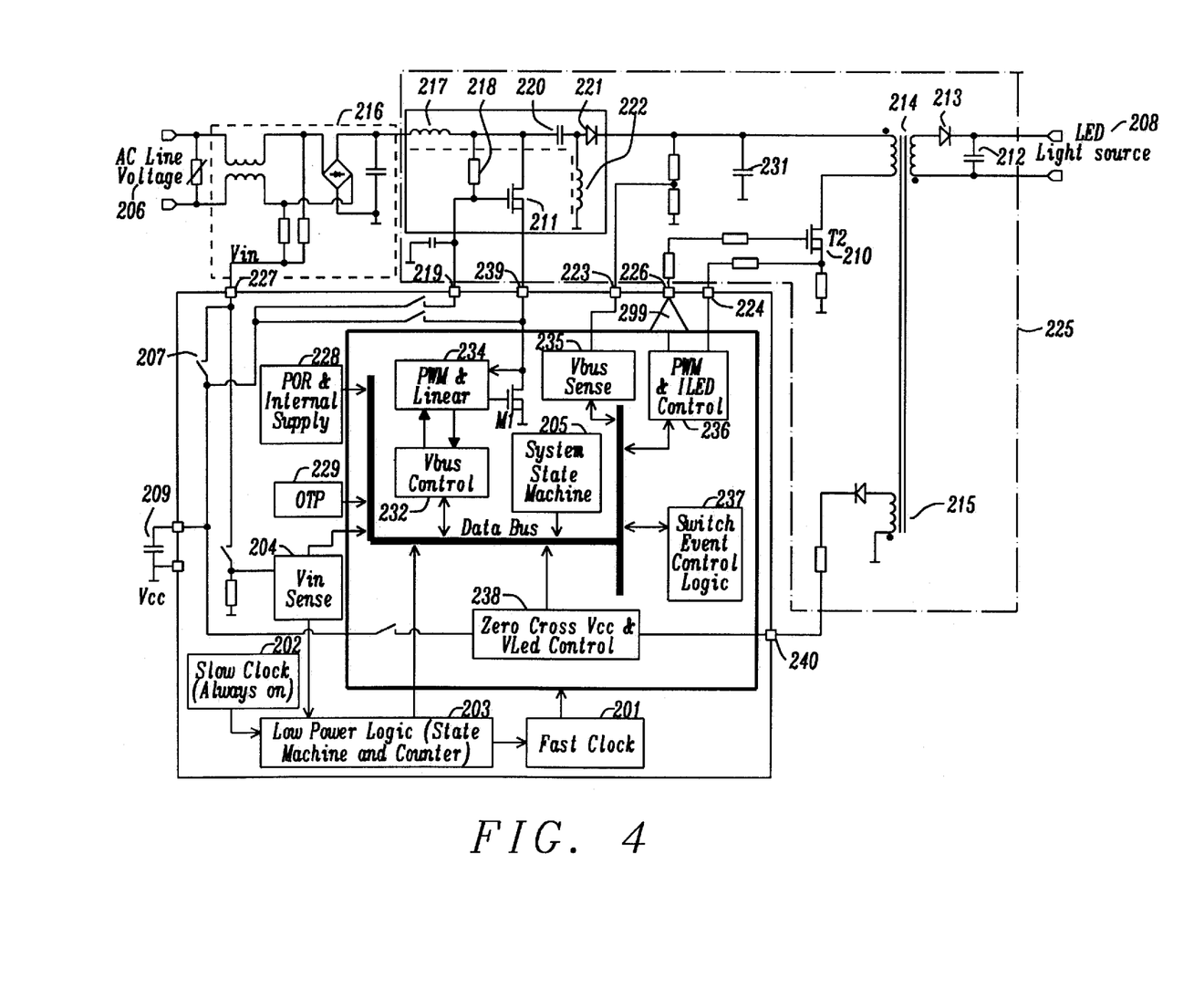
FIG. 4 illustrates an implementation example of the system.

For ease of reference, elements of FIGS. 3 and 4 that are similar or equivalent, share reference signs that are identical in the two least significant digit positions. For example, the controller 107 of FIG. 3 is equivalent to the controller 207 of FIG. 4.

FIG. 3 shows a schematic view of a system for controlling a light source 108. The system includes a rectifier in combination with EMI (electromagnetic interference) filter components 116, a power converter 125 and a control chip, i.e. a controller 107.

The rectifier in combination with EMI (electromagnetic interference) filter components 116 provides a rectified input voltage which is passed to the power converter 125.

The power converter 125 receives AC power from the rectifier in combination with EMI (electromagnetic interference) filter components 116, and operates to output a controlled drive signal to the light source 108. The power converter 125 may comprise, at least, an inductive energy storage device and, at least, a switch element. The switch element(s) are controlled by the controller 107, and may be provided by a metal oxide semiconductor field effect transistor (MOSFET), or other element suitable for switching high voltage (for example, tens of volts). It should be noted, however, that the controller 107 may comprise the switch element(s) itself, thereby directly controlling the provisioning of an appropriate drive current. In this manner, the power converter converts power derived from an input voltage waveform of a line voltage power supply into a drive signal for controlling the illumination states of the light source 108. The power converter 125 can be provided by any suitable circuit topology. For example, a buck converter circuit, a boost converter circuit, a buck/boost converter circuit, a SEPIC (single-ended primary-inductor converter) circuit, or a flyback converter circuit could be used for the power converter 125. It should be noted, however, that the power converter 125 is not limited to switched mode power converters, but may also be based on linear regulators or power converters using switched capacitors or any combination of these converter techniques.

The controller 107 includes a Vin detect module, namely an event detection unit 104, a control circuit 103, an oscillator 126, which generates one or more clock signals with different clock frequencies according to the needs and/or requirements of the controller 107, and a signal processing and control unit 105, namely a first state processor. Further, the control circuit 103 includes a timing circuit 130 (depicted in FIG. 3 as "Timing Function"), a memory unit 129 (depicted in FIG. 3 as "Storage Function"), a state control unit 127 and an adaptive chip power supply 199.

The controller 107 may operate in two power modes, namely a power-on mode and a power-off (standby) mode. Upon determination of a line voltage power-off event, the controller 107 changes the operation mode from the power-on mode to the power-off mode. In the same manner, in response to determination of a line voltage power-on event, the controller 107 changes the operation mode from the power-off mode to the power-on mode.

The elements of the control circuit 103, namely the timing circuit 130, the memory unit 129 and the state control unit 127 operate in the power-off mode. The signal processing and control unit 105 operates in the power-on mode. The oscillator 126 generates one or more clock signals with different clock frequencies according to the needs, requirements and/or power modes of the controller 107 and thus operates in both power modes. The signal processing and control unit 105 of the controller 107 may receive feedback signals, e.g. "Sensing" as depicted in FIG. 3, relating to the operation of the power converter 125 and/or to the operation of the light source 108.

In addition, the event detection unit 104 of the controller 107 receives the input voltage waveform Vin which is used by the controller 107 to determine an event for controlling the illumination state of the light source 108. The event detection unit 104 operates at least in the power-on mode. Individual events of the plurality of events for controlling the illumination state of the light source 108, which are encoded with the input voltage waveform of the line voltage power supply, are determined by the event detection unit 104.

The event detection unit 104 continuously observes the presence of input line voltage 106. In response to determination of a line voltage power-off event by the event detection unit 104, the controller 107 changes the operation mode from the power-on mode to the power-off mode. In particular, if the line voltage switch is turned off and Vin collapses, the event detection unit 104 sends a VinStatus signal 128 to the signal processing and control unit 105 and to the state control unit 127. The VinStatus signal 128 initiates an immediate turn off of the LED power. The state control unit 127 thereafter turns off the signal processing and control unit 105. Thus, upon determination of a line voltage power-off event, the controller 107 disables the signal processing and control unit 105 (also called first state processor). In addition, the state control unit 127 further controls the oscillator 126. In particular, the state control unit 127 instructs the oscillator 126 to generate a clock signal (called second clock signal, e.g. CLK2) with a lower clock frequency than the current clock frequency. In other words, the power-on clock signal (called first clock signal, e.g. CLK1) which is also generated by the oscillator 126 is disabled. Thus, elements of the controller 107 that are governed by the first clock signal (CLK1) are therefore disabled. It should be noted that the controller 107 may alternatively comprise two separate clock circuits, namely a first clock circuit which generates the first clock signal and a second clock circuit which generates the second clock signal (CLK2). Therefore, upon determination of a line voltage power-off event, the controller 107 disables the first clock circuit and enables the second clock circuit. The system thereafter remains in the power-off mode while monitoring the input voltage. In this manner, the controller 107 reduces the current consumption of the illumination system by at least one order of magnitude. Upon determination of a line voltage power-off event, the controller 107 may also disable the event detection unit 104. It should be noted that in this case a line voltage power-on event must remain determinable in the power-off mode, e.g. by means of the control circuit 103 directly monitoring the supply voltage without the assistance of the event detection unit 104.

In the same manner, in response to determination of a line voltage power-on event, the controller 107 changes the operation mode from the power-off mode to the power-on mode. Accordingly, the controller 107 enables the elements of the controller 107 which operate in the power-on mode by enabling the above indicated first clock circuit, the event detection unit 104 and the signal processing and control unit 105. In addition, the elements of the controller 107 which operate in the power-off mode are disabled upon determination of a line voltage power-on event. Alternatively, the elements of the controller 107 which operate in the power-off mode may remain enabled in the power-on mode.

According to the determination of further line voltage switch events, the controller 107 implements a state machine to control the illumination states of the light source 108. The state machine is described in detail with respect to the FIG. 5, below. As a result, the controller 107 determines control signals, e.g. "PWM" as depicted in FIG. 3, which are used to control the power converter 125 to provide an appropriate drive signal (e.g. an appropriate drive current) to the light source 108.

As indicated above, the oscillator 126 of the controller 107 generates a first clock signal and a second clock signal, wherein the oscillator 126 is controlled by the state control unit 127. Moreover, the oscillator 126 may generate the first clock signal based upon the second clock signal, e.g. using a PLL circuit.

In embodiments with 2 separate clock circuits, the first clock circuit operates in the power-on mode. Further, the second clock circuit operates at least in the power-off mode. In other words, the second clock circuit can also be enabled to operate in the power-on mode (e.g. "always on"). Therefore, the elements of the controller may thus operate in accordance to different clock signals based on the functionality and/or clock frequency requirements of each element of the controller and/or further settings of the controller. For example, the elements of the controller which operate in the power-on mode may operate in accordance to the first clock signal. In addition, the elements of the controller which operate in the power-off mode may operate in accordance to the second clock signal.

As already mentioned, the signal processing and control unit 105, i.e. the first state processor, of the controller 107 operates in the power-on mode in accordance to the first clock signal. The signal processing and control unit 105 receives a Vin status signal 128 from the event detection unit 104, and event data (e.g. the power-off time value) from a storage unit, e.g. the memory unit 129. The signal processing and control unit 105 generates the control signals, e.g. pulse width modulated (PWM) signals, for controlling the switch element(s) in the power converter 125. Typically, the control signals will be pulse width modulated (PWM) signals that control the duty cycle (that is, the ratio of 'on' to 'off') of the switch element(s) in the power converter 125, and hence to control the drive signal for controlling the illumination states of the light source 108. In this manner, the signal processing and control unit 105, namely the first state processor, of the controller 107 determines a next illumination state based on an event determined by the event detection unit 104, and on a current illumination state in accordance with the predetermined state machine.

The control circuit 103 of the controller 107 operates in the power-off mode in accordance to the second clock signal. The memory unit 129 of the control circuit 103 provides event data to the signal processing and control unit 105. Furthermore, in the power-off mode, the timing circuit 130 of the control circuit 103 is triggered and enabled to start counting. The memory unit 129 stores the counter value (called power-off time value) of the timing circuit 130. The memory unit 129 may store the counter value of the timing circuit 130 upon determination of a line voltage power-on event. It should be noted that the memory unit 129 may also store the counter value of the timing circuit upon determination of other determined events and/or a combination thereof. It should be noted that the counter value of the timing circuit 130 is to be considered as part of the above mentioned event data that is sent to the signal processing and control unit 105. Alternatively or in addition, it should be noted that other types of event data (e.g. counter values, thresholds, flags, etc.) may be sent to the signal processing and control unit 105 in order to set or adjust the control signals that are to be sent to the power converter 125 for controlling the illumination states of the light source 108 and/or to drive the elements of the illumination system. In this manner, the signal processing and control unit 105, namely the first state processor, may determine a next illumination state based on an event determined by the event detection unit 104, on a current illumination state in accordance with the predetermined state machine, on the counter value, e.g. the power-off time value, which is stored in the memory unit 129 of the control circuit 103, and/or further event data received from the control circuit 103.

As indicated above, the timing circuit 130 is triggered in the power-off mode. Therefore, the timing circuit 130 starts counting and keeps the counter of the timing circuit 130 running. If the line voltage returns within a defined (programmable) time window the control circuit 103 stores the most recent counter value provided by the timing circuit 130 inside the storage unit, e.g. the memory unit 129. It should be noted that the timing circuit 130 may be designed to count backward and/or forward. Upon determining that the line voltage returns, e.g. upon determination of a line voltage power-on event and/or upon determination of a power supply-high event, within a defined (programmable) time window, the system restarts and the signal processing and control unit 105 reads the counter value (which is provided by the timing circuit 130 and stored in the memory unit 129) and other event data from the dedicated low power logic, i.e. the control circuit 103. Dependant on the event data and/or the counter value, the signal processing and control unit 105 will act accordingly by generating control signals to the power converter 125, thereby controlling the power converter 125 for setting an appropriate illumination state of the light source 108, i.e. for setting an appropriate light level.

For instance, if the power-off time value is smaller than a minimum power-off time value, the next illumination state is the same as the current illumination state. In other words, no change of the illumination state is performed. In this manner, a glitch, irregularity or malfunction is determined.

FIG. 4 illustrates an example circuit diagram of a system comprising a line voltage, e.g. the AC line voltage 206, a rectifier in combination with EMI (electromagnetic interference) filter components 216, a dual stage power converter 225 and a controller 207 configured to control operation of a light source 208.

The power converter 225 converts power derived from an input voltage waveform of a line voltage power supply, e.g. the AC line voltage 206, into a drive signal for the light source 208. The operation of power converter 225 is controlled by the controller 207.

The controller 207 has a plurality of output pins, e.g. 219, 239, and 226, for providing control signals to power converter switches, e.g. MOSFETs 210 and 211. The control signals may be pulse width modulated (PWM) driver signals generated by respective control modules, e.g. PWM & linear drive 234 and PWM & ILED control module 236. Further, the controller 207 uses pin 219 during startup for sensing using a startup resistor 218. In this embodiment, a dual stage SEPIC/Flyback converter is provided, wherein the first converter (a SEPIC converter) comprises the components 211, 217, 218, 220, 221 and 222, and wherein the second converter (a flyback converter) comprises the components 212, 213, 214, 215. In the illustrated example, the second converter stage provides for SELV (Separated or safety extra-low voltage) requirements. Furthermore, the output of the first converter stage (Vbus) is sensed via a sensing pin 223 and a Vbus sensing module 235, thereby allowing for a regulation of the first converter stage. In a similar manner, the output of the second converter stage can be sensed using input pin 224 and used by the PWM & ILED control module 236 to generate an appropriate PWM signal for driving transistor T2 210 so that the desired LED current ILED for the present dimming state is provided to the LED light source 208. The PWM & ILED control module 236 also feeds driver 299, which drives node 226.

In general, the power converter 225 may be a single stage power supply or a multi-stage power supply. The use of a multi-stage power converter may be beneficial to stabilize a (rectified) voltage received from the line voltage supply in a first stage, thereby providing a stable intermediate voltage Vbus, e.g. at a large capacitor 231 between the first stage and the subsequent stage(s). The intermediate voltage may be in the range of 100-200V. The intermediate voltage Vbus is controlled by a Vbus control module 232 and a PWM & linear drive module 234 which generates a drive voltage for an internal transistor M1.

Subsequently, the conversion to the supply voltage of the light source, e.g. LED, may be done by converting the stable intermediate voltage using a second (and possibly further) power converter stages.

It should be noted further that each lamp assembly can include several parallel converters and light source modules (sub light sources). The illumination state can therefore comprise a vector of sub states valid for each of the parallel power supply and light source modules. All parameters to configure the system may be stored in a one-time programmable (OTP) memory 229.

The controller 207 controls the light source 208 using the power converter 225 according to a plurality of illumination states subject to determine an event of a plurality of events. The control of the illumination states is performed in a system state machine 205 (first state processor). The controller 207 operates in a power-on mode and in a power-off mode. The controller 207 comprises: a Vin sense module, e.g. an event detection unit 204 which determines an event of the plurality of events encoded within the input voltage waveform of the line voltage power supply. The event detection unit 204 operates at least in the power-on mode. The controller further comprises a first clock circuit 201, e.g. Fast Clock as depicted in FIG. 4, which generates a first clock signal. The first clock circuit 201 operates in the power-on mode. The first state processor 205 determines a next illumination state of the plurality of illumination states, based on an event determined by the event detection unit 204 and based on a current illumination state in accordance to a predetermined state machine. The first state processor 205 operates in the power-on mode and in accordance to the first clock signal. A second clock circuit 202, e.g. Slow Clock as depicted in FIG. 4, generates a second clock signal. The second clock circuit 202 operates at least in the power-off mode. In other words, the second clock circuit may also operate in the power-on mode ("always on"). A control circuit 203 operates in the power-off mode and in accordance to the second clock signal. The control circuit 203 comprises a timing circuit, e.g. the timing circuit 130 of FIG. 3, for determining a power-off time value. The control circuit 203 may optionally comprise a second state processor for tracking line voltage power on/off events and power supply-low/high events. Furthermore, control circuit 203 may optionally comprise a power on reset (POR) & internal supply unit 228 to provide for internal power supply and setting the logic into a defined state upon a power-on event. The POR & internal supply unit 228 may include means to sense the input voltage Vin supplied by pin 227. In addition, a switch event control logic 237 may be provided.

In response to determination of a line voltage power-off event by the event detection unit 204, the controller 207 changes the operation mode from the power-on mode to the power-off mode and the timing circuit, e.g. the timing circuit 130 of FIG. 3, starts counting. In this manner, upon detection of a line voltage power-off event, the second state processor may thus enter a power-down state where the timing circuit 130 of FIG. 3 is enabled to measure a time where no line voltage is applied.

Moreover, the controller 207 is connected to an energy storage element 209 to power the controller 207 during line voltage power-off times. Thus, the energy storage element 209 powers the controller during times where no power is supplied by the line voltage power supply. During operation of the power converter 225, the internal operating voltage Vcc for the controller 207 is provided by coil 215 of the flyback converter which is connected (via a diode and a resistor) to input pin 240 and a module 238 for efficiently generating Vcc. During operation of the power converter 225, the internal operating voltage Vcc is connected (via a switch) to the energy storage element 209. During startup times when the power converter 225 is not yet operating, the operating voltage is generated from the line voltage, e.g. the AC Line voltage 206, via resistors in the rectifier in combination with EMI filter components 216 and supplied via input pin Vin 227. Since module 238 receives a feedback from the flyback converter via input pin 240, it can further be used to control the converter output voltage VLED and to determine the zero crossing in the flyback converter, which information may be used to control the switching times of transistor T2 210.

The controller 207 determines a power supply-low event if a voltage supplied by the energy storage element 209 drops below a first voltage threshold. The controller 207 may further determine a power supply-low event of the energy storage element 209 if the power-off time value exceeds a minimum counter value before a line voltage power-on event is determined.

The controller 207 further determines a power supply-high event if the voltage supplied by the energy storage element 209 exceeds a second voltage threshold. Therefore, the second state processor, which operates in the power-off mode, would be able to track, inter alia, a power supply-high event and may thus provide the determination of a line voltage power-on event when the controller is in the power-off mode. In this manner, the need for enabling other elements of the controller which operate in the power-on mode is prevented with the corresponding reduction of power consumption. In other words, a line voltage power-on event may be determined in the power-down state when a power supply-high event is determined before a power supply-low event is determined. During line voltage power-off times, the controller therefore determines a line voltage power-on event, such that, upon determination of a line voltage power-on event, the controller 207 changes the operation mode from the power-off mode to the power-on mode.

Figure 5:
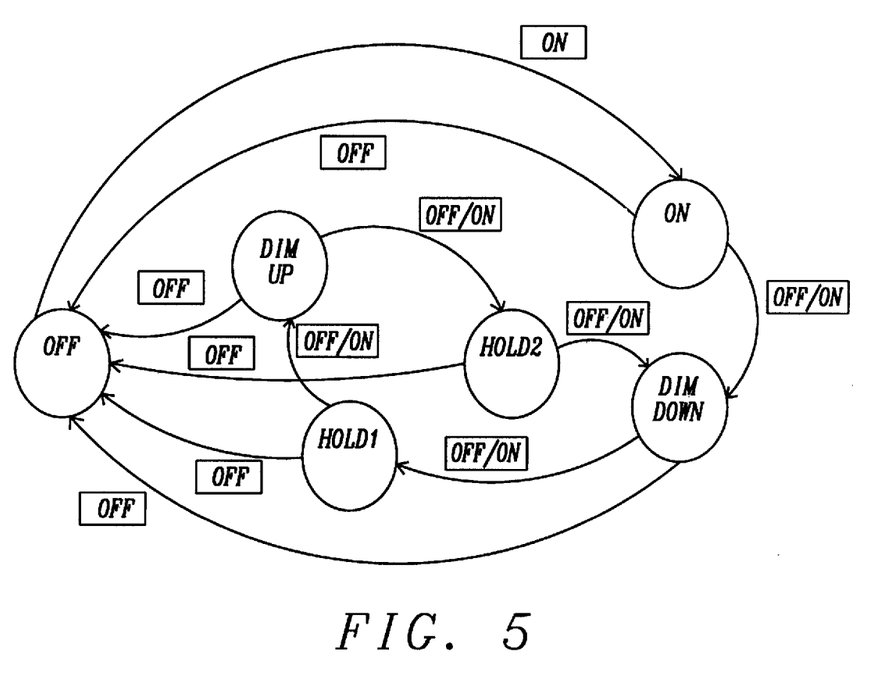
FIG. 5 shows an example for the illumination states determined by the first state processor of the controller.

FIG. 5 illustrates an example for the illumination states determined by the first state processor of the controller subject to determine an event. In other words, FIG. 5 shows an example state machine of the controller in the power-on mode. The events are:
- an event "ON": corresponding to a line voltage switch which is kept on for a minimum pre-determined time interval, and consequently to an RMS voltage which is above a predetermined on voltage value and which does not change over time.
- an event "OFF": corresponding to a line voltage switch which is kept off for a minimum pre-determined time interval, and consequently to an RMS voltage which is below a predetermined off voltage value. In particular, the RMS voltage may be zero.
- an event "OFF/ON": corresponding to an event where the main switch is briefly switched from ON to OFF and then back to ON within a predetermined time interval. Consequently, the input voltage detected by the controller goes from an RMS voltage value above the on voltage value to an RMS voltage value below the off voltage value and back up to an RMS voltage value above the on voltage value within the predetermined time interval (e.g. 2 seconds). The event "OFF/ON" is an example for a sequential event using voltage modulation and timing information to encode control information to be transmitted from the line voltage supply to the controller.

These events in combination with the current illumination state can be used to provide a dimming function (even when no phase-cut dimmer is available at the line voltage supply). It can be seen from FIG. 5, how the ON event can be used to change the illumination state from the state "OFF", i.e. no light intensity, to the state "ON", i.e. maximum light intensity, and how the OFF event can be used to perform the inverse change of illumination states. When in the "ON" state, the OFF/ON event can be used to put the system into a "DIM DOWN" state. The "DIM DOWN" state triggers a smooth decrease in intensity down towards a minimum intensity (e.g. 20% intensity). Using another OFF/ON event, the "DIM DOWN" state may be stopped, thereby putting the system into a "HOLD1" state at the current intensity. When detecting another OFF/ON event, the system is put into a "DIM UP" state, thereby smoothly increasing the intensity up to the maximum intensity. Another OFF/ON event may again put the system into a "HOLD2" state (which differs from the "HOLD1" state in that a subsequent OFF/ON event will retrigger the "DIM DOWN" state, instead of the "DIM UP" state). Whenever detecting an OFF event, the system is put into the OFF state, wherein this OFF state can only be left, when detecting an ON event.

It should be noted that variations of the above described state machine may be implemented in order to provide a dimming function using a line voltage switch as signaling means. By way of example, the OFF/ON event may be used to trigger a saw wave like dim state where the intensity of the light is smoothly and repeatedly dimmed up and down between the minimum intensity and the maximum intensity. A subsequent OFF/ON event may be used to hold the intensity of the light at the current intensity level, and a further subsequent OFF/ON event may restart the saw wave like DIM state at the current intensity level. As such, a user may select an appropriate dim level by the subsequent use of OFF/ON events.

Figure 6:
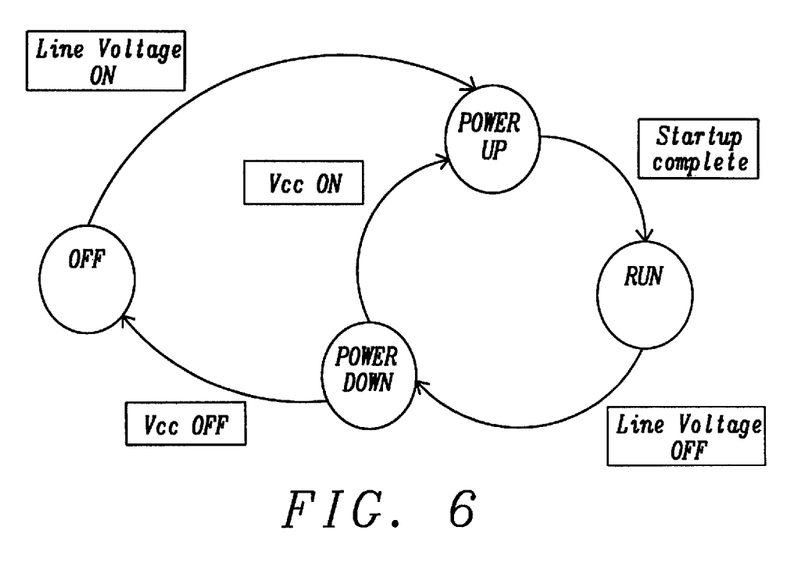
FIG. 6 shows states inside the dedicated low power logic, i.e. the control circuit of the controller.

FIG. 6 illustrates an example for states used inside the control circuit, e.g. a dedicated low power logic. In other words, FIG. 6 shows an example state machine of the controller in the power-off mode as used by the above indicated second state processor. The events are:
- an event "Line voltage OFF": corresponding to a loss of line voltage power, and consequently to an RMS voltage which is below a predetermined off voltage value. In particular, the RMS voltage may be zero;
- an event "Line voltage ON": corresponding to a return of line voltage power, and consequently to an RMS voltage which is above a predetermined on voltage value and which does not change over time;
- an event "Vcc OFF": corresponding to an event where a power supply-low event is determined if a voltage supplied by the energy storage element to the controller drops below a first voltage threshold. Alternatively, an event "Vcc OFF" may be determined by means of comparing the counter value of the timing circuit 130 of the controller 107 (see FIG. 3) with a pre-determined value; and
- an event "Vcc ON": corresponding to an event where a power supply-high event or a line voltage power-on event is determined if a voltage supplied by the energy storage element to the controller rises above a second voltage threshold.

These events in combination with the current state of the controller in the dedicated low power logic can be used to provide a line voltage switch event detection function (even when no power is available at the line voltage terminals). It can be seen from FIG. 6, how the "Line voltage ON" event can be used to change the controller from the state "OFF", i.e. the controller is stopped, to the state "POWER UP", i.e. to initiate the startup of the controller to put the controller into the state "RUN" after the startup is completed, i.e. to put the controller into the power-on mode. When in the "RUN" state, a "Line voltage OFF" event can be used to put the system into a "POWER DOWN" state. The "POWER DOWN" state triggers a timing circuit, e.g. the timing circuit 130 of FIG. 3, which starts counting. When in the "POWER DOWN" state and a "Vcc OFF" event is determined, the controller is put into an "OFF" state, thereby stopping the controller. By contrast, when in the "POWER DOWN" state and a "Vcc ON" event is determined, the controller is put to into a "POWER UP" state, thereby initiating the startup of the controller to put the controller into the state "RUN".

It should be noted that variations of the above described state machine may be implemented. For example, if a minimum counter value is reached when the controller is in the "POWER DOWN" state, the system stops and enters an infinite wait mode until the voltage in the Vcc reaches a determined voltage threshold and/or until a "Vcc ON" is determined. Any restart from that point initiates a full reset of the entire system in its default status as indicated by the event data.

Figure 7:
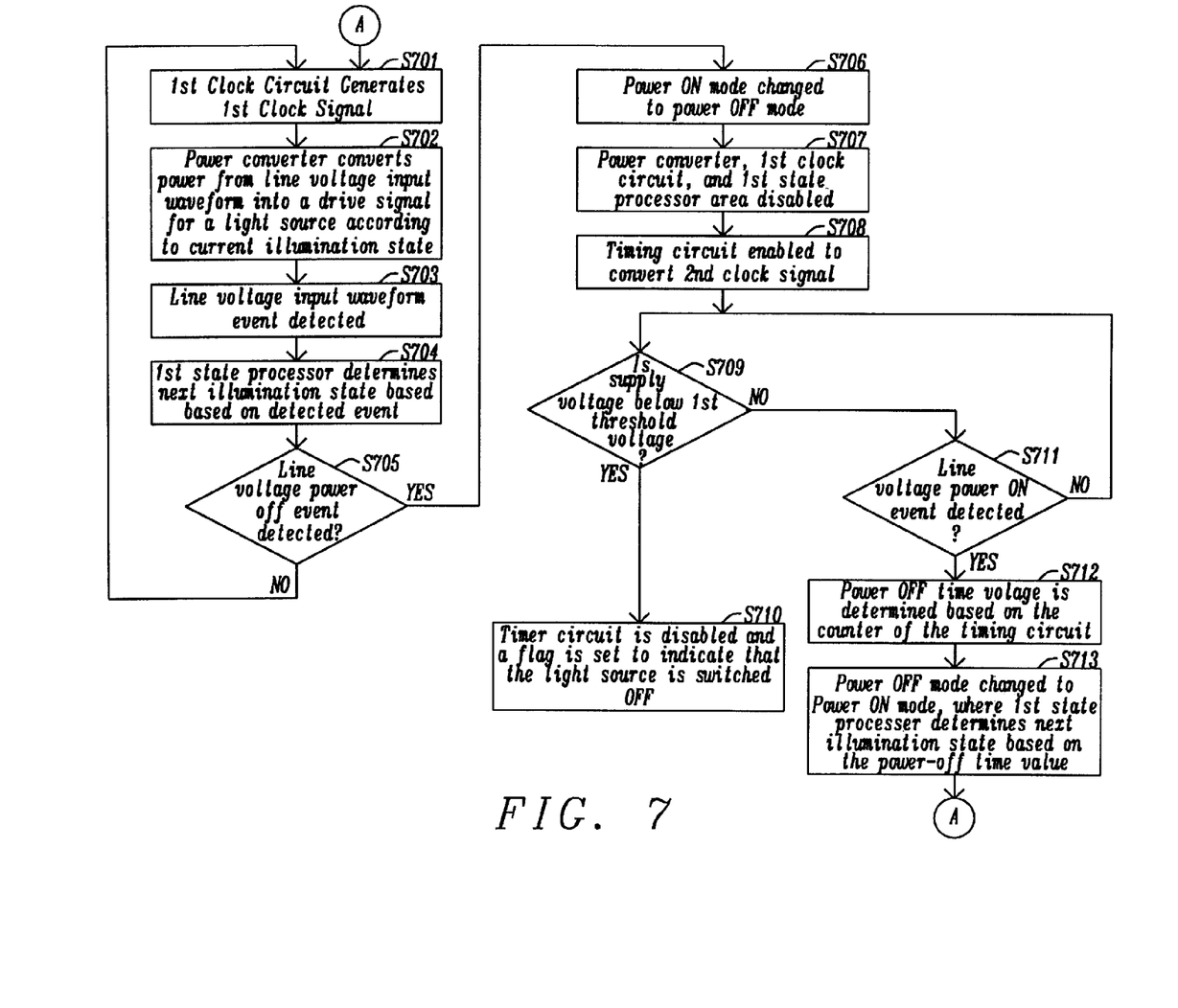
FIG. 7 shows a flow diagram of a method for controlling the illumination states of a light source.

FIG. 7 shows a flow diagram of a method for controlling a light source according to a plurality of illumination states subject to determine an event of a plurality of events according to an embodiment. The method operates in a power-on mode (steps S701 to S706) and in a power-off mode (S707 to S713), In step S701, a first clock circuit is operated to generate a first clock signal. In step S702, a power converter is controlled to convert power derived from an input voltage waveform of a line voltage power supply into a drive signal for a light source, according to the current illumination state and the first clock signal. In step S703, an event of the plurality of events encoded within the input voltage waveform of the line voltage power supply is detected. In step S704, a first state processor is operated to determine a next illumination state of the plurality of illumination states, based on a detected event and on a current illumination state and in accordance to the first clock signal. In step S705, it is monitored whether a line voltage power-off event is determined. In response to determining of a line voltage power-off event, the operation mode is changed from the power-on mode to the power-off mode in step S706. Otherwise, in step S705, if a line voltage power-off event is not determined, the operation mode reline voltage in the power-on mode and the method returns to the step S701.

In step S707, the power converter, the first clock circuit and the first state processor are disabled. In step S708, a timing circuit is enabled to start counting based on a second clock signal. In step S709, a supply voltage is determined and the supply voltage is compared to a first voltage threshold. If the comparing determines that the supply voltage is below the first voltage threshold, in step S710, the timer circuit is disabled and a flag is set to indicate that the light source is switched off. Otherwise, in step S709, if the comparing determines that the supply voltage is not below the first voltage threshold, in step S711, it is monitored whether a line voltage power-on event is determined. In response to determining a line voltage power-on event, a power-off time value is determined, in step S712, based on the counter of the timing circuit and, in step S713, the operation mode is changed from the power-off mode to the power-on mode, wherein the first state processor determines the next illumination state based upon the power-off time value, and the method therefore returns to the step S701 (this return is depicted as "A" in the FIG. 7).

Otherwise, in step S711, if a line voltage power-on event is not determined, the supply voltage is again compared to the first voltage threshold in step S709.

It should be noted that the description and drawings merely illustrate the principles of the proposed methods and systems. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

What is claimed is:

1. A controller configured to control a light source according to a plurality of illumination states subject to determine an event of a plurality of events, wherein the controller is configured to control a power converter that converts power derived from an input voltage waveform of a line voltage power supply into a drive signal for the light source, the controller generating one or more control signals for controlling one or more switching elements of the power converter in accordance with a current illumination state, the controller configured to operate in a power-on mode and in a power-off mode, the controller comprising:

a first clock circuit configured to generate a first clock signal, wherein the first clock circuit is enabled to operate in the power-on mode;

a first state processor configured to determine a next illumination state of the plurality of illumination states, based on a detected event and on the current illumination state, wherein the first state processor is configured to operate in the power-on mode and in accordance to the first clock signal;

a second clock circuit configured to generate a second clock signal, the second clock signal having a lower frequency than the first clock signal, wherein the second clock circuit is enabled to operate at least in the power-off mode;

a control circuit configured to operate in the power-off mode and in accordance to the second clock signal, the control circuit comprising a timing circuit for determining a power-off time value; and a memory unit; wherein in response to detection of a line voltage power-off event, the controller changes the operation mode from the power-on mode to the power-off mode, and disables the first state processor and the first clock circuit, and the timing circuit is enabled to start counting based on the second clock signal, and in response to detection of a line voltage power-on event, the control circuit stores the power-off time value in the memory unit, the controller changes the operation mode from the power-off mode to the power-on mode, thereby enabling the first state processor and the first clock circuit, and the first state processor determines the next illumination state based on the current illumination state and the power-off time value stored in the memory unit.

2. The controller according to claim 1, wherein the one or more control signals for controlling the one or more switching elements of the power converter are pulse width modulated signals to control the duration of on and off times of the power converter switching elements, thereby controlling a drive current for the light source according to the current illumination state.

3. The controller according to claim 1, wherein, if the power-off time value is smaller than a minimum power-off time value, the next illumination state is the same as the current illumination state.

4. The controller according to claim 1, wherein if the next illumination state is a DIM state, the controller is configured to control the power converter such that a variable drive signal for the light source is generated, in order to effect an increasing or decreasing light emission from the light source.

5. The controller according to claim 1, comprising an event detection unit configured to determine an event of the plurality of events encoded within the input voltage waveform of the mains power supply.

6. The controller according to claim 1, wherein upon determination of a line voltage power-off event, the controller is further configured to control the power converter to switch off the drive signal for the light source.

7. The controller according to claim 1, wherein the control circuit stops the controller when the power-off time value exceeds a maximum wait time before a line voltage power-on event is determined.

8. The controller according to claim 1, wherein the controller is configured to be connected to an energy storage element to power the controller during times where no power is supplied by the line voltage power supply.

9. The controller of claim 8, wherein the controller is configured to determine a power supply-low event if a voltage supplied by the energy storage element drops below a first voltage threshold.

10. The controller according to claim 1, wherein the controller is configured to determine a power supply-low event if the power-off time value exceeds a minimum counter value before a line voltage power-on event is determined.

11. The controller according to claim 8, wherein the controller is configured to determine a power supply-high event based upon the voltage supplied by the energy storage element exceeding a second voltage threshold.

12. The controller according to claim 1, wherein the control circuit comprises a second state processor for tracking line voltage power-on/off events and power supply-low/high events.

13. The controller according to claim 12, wherein upon detection of a line voltage power-off event, the second state processor enters a power-down state where the timing circuit is enabled, and wherein a line voltage power-on event is determined in the power-down state when a power supply-high event is determined.

14. The controller according to claim 1, wherein the second clock circuit is the master clock and configured to operate in the power-on mode and in the power-off mode, and wherein the first clock circuit generates the first clock signal based upon the second clock signal, the clock frequency of the first clock circuit being higher than the frequency of the second clock circuit.

15. A method for controlling a light source according to a plurality of illumination states subject to determine an event of a plurality of events, the method operating in a power-on mode and a power-off mode, the method comprising in the power-on mode, the steps of:
operating a first clock circuit to generate a first clock signal;
controlling a power converter that converts power derived from an input voltage waveform of a line voltage power supply into a drive signal for the light source, according to the current illumination state and the first clock signal by generating one or more control signals for controlling one or more switching elements of the power converter in accordance with the current illumination state;
detecting an event of the plurality of events encoded within the input voltage waveform of the line voltage power supply;
operating a first state processor to determine a next illumination state of the plurality of illumination states, based on a detected event and on a current illumination state and in accordance to the first clock signal; and
in response to determining of a line voltage power-off event, changing the operation mode from the power-on mode to the power-off mode, the method comprising in the power-off mode, the steps of:
disabling the power converter, the first clock circuit and the first state processor;
enabling a timing circuit to start counting based on a second clock signal, the second clock signal having a lower frequency than the first clock signal;
determining a supply voltage and comparing the supply voltage to a first voltage threshold;
if the comparing determines that the supply voltage is below the first voltage threshold, disabling the timer circuit and setting a flag to indicate that the light source is switched off; and
in response to determining a line voltage power-on event, determining a power-off time value based on the counter of the timing circuit and changing the operation mode from the power-off mode to the power-on mode, thereby enabling the power converter, the first state processor and the first clock circuit, the first state processor determining the next illumination state based on the current illumination state and the power-off time value.

16. A method for providing a controller to control a light source according to a plurality of illumination states subject to determine an event of a plurality of events, wherein the controller controls a power converter that converts power derived from an input voltage waveform of a line voltage power supply into a drive signal for the light source, the controller generating one or more control signals for controlling one or more switching elements of the power converter in accordance with a current illumination state, the controller operates in a power-on mode and in a power-off mode, the method comprising the steps of:

generating a first clock signal by a first clock circuit, wherein the first clock circuit operates in the power-on mode;
determining a next illumination state of the plurality of illumination states by a first state processor, based on a detected event and on a current illumination state, wherein the first state processor operates in the power-on mode and in accordance to the first clock signal;
generating a second clock signal by a second clock circuit, the second clock signal having a lower frequency than the first clock signal, wherein the second clock circuit operates at least in the power-off mode;
operating a control circuit in the power-off mode and in accordance to the second clock signal, the control circuit comprising a timing circuit for determining a power-off time value; and
providing a memory unit; wherein
in response to detection of a line voltage power-off event, the controller changes the operation mode from the power-on mode to the power-off mode, and disables the first state processor and the first clock circuit, and the timing circuit is enabled to start counting based on the second clock signal, and in response to detection of a line voltage power-on event, the control circuit stores the power-off time value in the memory unit, the controller changes the operation mode from the power-off mode to the power-on mode, thereby enabling the first state processor and the first clock circuit, and the first state processor determines the next illumination state based on the current illumination state and the power-off time value stored in the memory unit.

17. The method for providing a controller according to claim 16, wherein the one or more control signals for controlling the one or more switching elements of the power converter are pulse width modulated signals to control the duration of on and off times of the power converter switching elements, thereby controlling a drive current for the light source according to the current illumination state.

18. The method for providing a controller according to claim 16, wherein, if the power-off time value is smaller than a minimum power-off time value, the next illumination state is the same as the current illumination state.

19. The method for providing a controller according to claim 16, wherein if the next illumination state is a DIM state, the controller controls the power converter such that a variable drive signal for the light source is generated, in order to effect an increasing or decreasing light emission from the light source.

20. The method for providing a controller according to claim 16, comprising an event detection unit configured to determine an event of the plurality of events encoded within the input voltage waveform of the mains power supply.

21. The method for providing a controller according to claim 16, wherein upon determination of a line voltage power-off event, the controller controls the power converter to switch off the drive signal for the light source.

22. The method for providing a controller according to claim 16, wherein the control circuit stops the controller when the power-off time value exceeds a maximum wait time before a line voltage power-on event is determined.

23. The method for providing a controller according to claim 16, wherein the controller connects to an energy storage element to power the controller during times where no power is supplied by the line voltage power supply.

24. The method for providing a controller of claim 23, wherein the controller determines a power supply-low event if a voltage supplied by the energy storage element drops below a first voltage threshold.

25. The method for providing a controller according to claim 16, wherein the controller determines a power supply-low event if the power-off time value exceeds a minimum counter value before a line voltage power-on event is determined.

26. The method for providing a controller according to claim 23, wherein the controller determines a power supply-high event based upon the voltage supplied by the energy storage element exceeding a second voltage threshold.

27. The method for providing a controller according to claim 16, wherein the control circuit comprises a second state processor for tracking line voltage power-on/off events and power supply-low/high events.

28. The method for providing a controller according to claim 27, wherein upon detection of a line voltage power-off event, the second state processor enters a power-down state where the timing circuit is enabled, and wherein a line voltage power-on event is determined in the power-down state when a power supply-high event is determined.

29. The method for providing a controller according to claim 16, wherein the second clock circuit is the master clock and operates in the power-on mode and in the power-off mode, and wherein the first clock circuit generates the first clock signal based upon the second clock signal, the clock frequency of the first clock circuit being higher than the frequency of the second clock circuit.

* * * * *